3,338,749
CATHODIC HYDROGEN CELL AND
METHOD OF MAKING
Carl E. Johnson, Elk Grove, Robert R. Heinrich, Downers Grove, and Carl E. Crouthamel, Glen Ellyn, Ill., assignors to the United States of America as represented by the United States Atomic Energy Commission
Filed Mar. 13, 1964, Ser. No. 351,877
7 Claims. (Cl. 136—86)

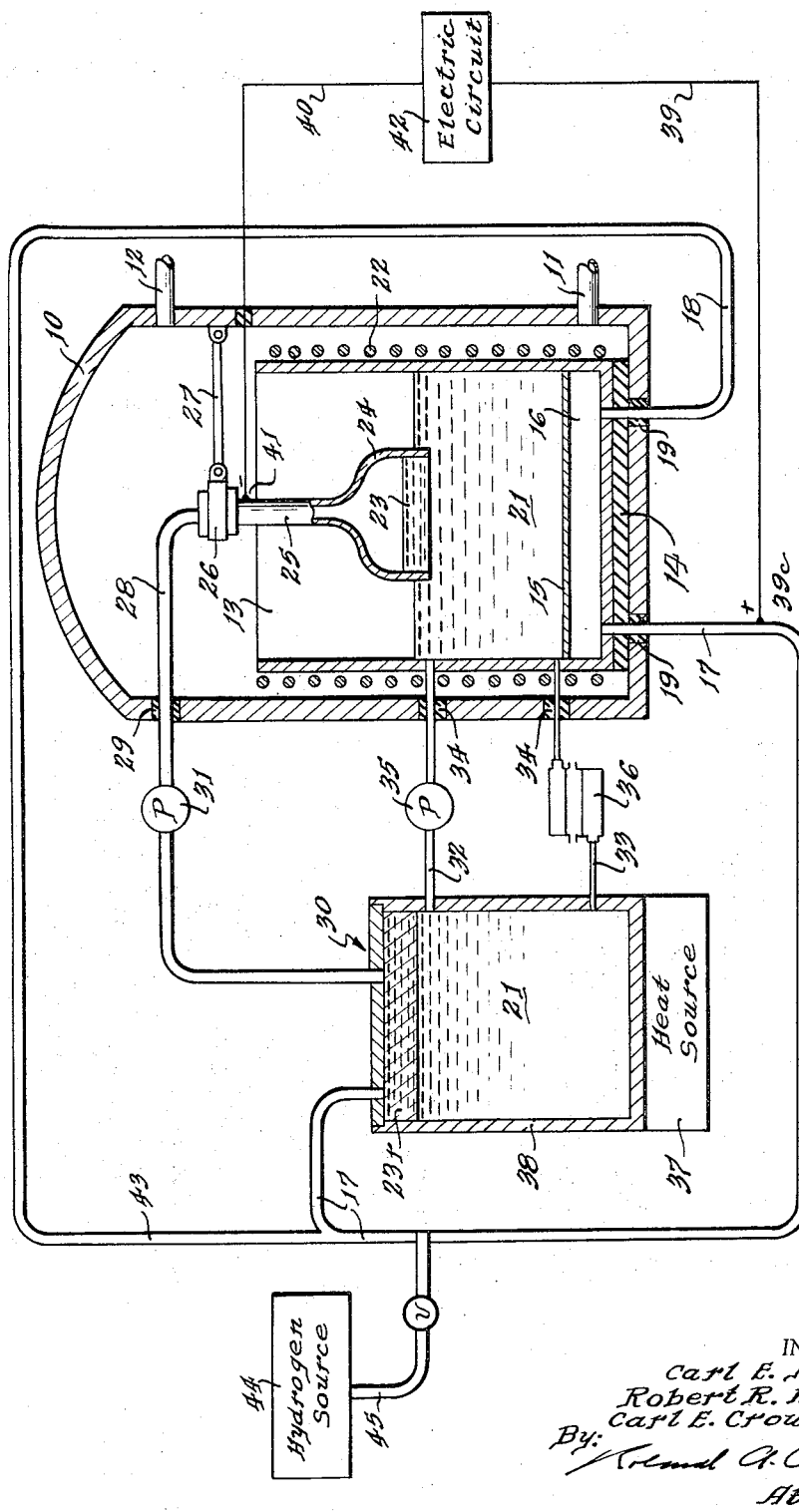

ABSTRACT OF THE DISCLOSURE

Method of increasing the efficiency of a fuel cell including a metal anode, a hydrogen cathode, a fused salt electrolyte and a vanadium diaphragm consisting of purifying the fused salt electrolyte to remove water of crystallization and oxygen thereform before use of the electrolyte.

---

The invention relates to an improved fuel cell of the cathodic hydrogen type, also known as the hydrogen-hydride type, and to a method of making the same. More particularly, the invention relaes to an improved cathode diaphragm, and to an improved method of purifying the fused salt electrolyte for such a cell.

Fuel cells of the cathodic hydrogen type are known, as shown by United States Patents Nos. 3,031,518, 3,119,723, and elsewhere. This kind of cell has been under investigation for a number of years mainly because of the possibility of regenerating the electrolyte by thermally decomposing the metal hydrides produced by the cell into the anodic metal, such as lithium, and hydrogen, thus providing a continuous resupply of cell reactants and, in effect, converting heat into electricity. This concept, while theoretically promising has not yet been sufficiently developed as to become economically competitive with conventional methods of electrical generation, chiefly because the output of the cells is too small.

A cathodic hydrogen cell depends for its operation on the diffusion of hydrogen gas through a cathode diaphragm, or barrier, into the electrolyte, which is a molten salt, or salt mixture, of the class consisting of alkali and alkaline earth halides. Salts of this kind, in order to be in the molten state, have to be kept at between 500° and 600° C., and at these temperatures they are so highly corrosive that it has been difficult to find a material for the cathode diaphragm which combines the requisite resistance to corrosion with a sufficient permeability to hydrogen to permit worthwhile current density to form on the side in contact with the electrolyte.

So far, the best material which has been discovered for this purpose has been iron, which is actually more resistant to the corrosive action of the fused salt electrolyte than noble metals such as platinum and palladium. However, iron has but a limited permeability to hydrogen; for a sheet, one millimeter thick against a pressure drop of one atmosphere at 500° C., the hydrogen permeability of iron is only $7.5 \times 10^{-3}$ cubic centimeters of hydrogen per minute per square centimeter ($cm.^3/min.\ cm.^2$). This permeability limits the current density of the cathode of the cell to an operatnig valve of about 30 milliamperes per square centimeter ($ma./cm.^3$), and hence restricts the electrical output of the cell. While an output two or more times greater than this has been observed for a short time after a freshly made-up cell is activated, this quickly subsides due to the accumulation of metal hydrides in the electrolyte and the operating current density above mentioned prevails from then on.

Among the many metals which have been tried unsuccessfully as a diaphragm has been vanadium. In spite of careful purification of the electrolyte with a getter metal at high temperatures, a vanadium diaphragm was consumed even before a cell could be completely assembled and put into operation. (See Technical Documentary Report No. ASD–TDR–62–241, June 1962, page 38. Available from the Office of Technical Services, U.S. Department of Commerce, Washington 20231, D.C., and from Armed Services Technical Information Agency (ASTIA), Arlington Hall Station, Arlington 22212, Va.)

It is, accordingly, the general object of the invention to provide an improved cell of the cathodic hydrogen type.

It is a more particular object to provide such a cell with a vanadium cathode diaphragm, or barrier.

It is another object to provide a method of making a cathodic hydrogen cell with a vanadium diaphragm.

Other objects will appear as the description proceeds.

The foregoing objects are attained by our discovery that a vanadium cathode diaphragm will not decompose, as was formerly believed, if the electrolyte is treated with chlorine gas at high temperatures in order to remove oxygen, water, and oxalate impurities. A cathodic hydrogen cell made according to our invention has operated at current densities between 120 and 150 $ma./cm.^2$ continuously at 550° C. with a LiCl–LiF eutectic electrolyte for 500 hours without any signs of deterioration by the vanadium diaphrgarm.

We have made the further discovery that by giving the vanadium diaphragm a combination of heat and lattice-expansion treatment a current density of 500 $ma./cm.^2$ may be attained, a full order of magnitude greater than the 30 $ma./cm.^2$ current density of conventional cells using an iron diaphragm.

Attention is now called to the drawing, the only figure of which is a partly schematic, partly sectional view of a preferred form of our improved cell and its thermal electrolyte-regenerating system.

Reference numeral 10 designates an outer gas-tight shell with inert gas inlet 11 and outlet 12, for maintaining an inert gas atmosphere within the shell 10.

Within the shell 10 is the cell vessel 13 which rests on insulating disk 14 on the bottom of shell 10. Preferably the vessel is either all made of pure iron, or its upper part may be made of some corrosion resistant metal such as stainless steel, with its lower part of pure iron as will be explained.

Across the lower part of vessel 13, somewhat resembling a false bottom, is the cathode diaphragm, or barrier, 15, made of essentially pure rolled sheet vanadium. Preferably, this should be given the combination of heat and lattice-expansion treatment which will be described in more detail later, and its thickness is preferably about one millimeter. It is welded about its perimeter to the vessel 13; the vessel 13 is preferably made of pure iron, or, if not, it should be such where it is in contact with the diaphragm 15.

The volume created by the diaphragm 15 above the bottom of the vessel 13 is the hydrogen or oxidizing gas space, the apparent contradiction in terms being due to the fact that in a cathodic hydrogen cell, hydrogen actually acts as an oxidizing agent as will be explained. Into the gas space 16 hydrogen gas inlet line 17 admits hydrogen gas and outlet line 18 carries it out, thereby maintaining a constant flow or hydrogen throughout the gas space during the operation of the cell and the apparatus. Lines 16 and 17 are electrically conductive and are electrically insulated from the shell 10 by lead-in seals 19.

Within the cell vessel 13, supported by the diaphragm 15 is a fused salt electrolyte 21, preferably the LiF–LiCl eutectic when a lithium metal anode is used. Electrolyte 21 is kept in a molten condition by coil heater 22 surrounding the vessel 13. Its method of purification, already referred to, will be explained in more detail later.

The anode of the cell is a pool 23 of molten metal, in this embodiment lithium, which is held in place on top of the fused electrolyte 21 by funnel-shaped anode cap 24 which tapers upward to tube shape 25 where it is gripped by insulator 26, which, in turn, is supported by arm 27 from shell 10.

When hydrogen gas is supplied to gas space 16 it diffuses through the diaphragm 15 in protonic form which is believed to be brought about by the catalytic action of the metal of the diaphragm according to this equation:

$$\tfrac{1}{2} H_2 \rightarrow H \rightarrow H^+ + e$$

The above disassociations occur in rapid succession, and the resulting "cloud" of protons and electrons passes through the metal of the diaphragm, and on emerging on the opposite surface considerable recombination takes place in this fashion:

$$H^+ + e \rightarrow H$$

However, instead of the usual recombination from atoms to molecules taking place, the metal cathode yields electrons to the atoms, thereby becoming positively charged, while the hydrogen atoms with the electrons taken from the metal are converted to negatively charged hydride ions, according to this equation:

$$H + e \rightarrow H^-$$

Meanwhile the metal anode becomes negatively charged as positive ions of the metal enter the electrolyte, leaving behind an electron, thus:

$$M \rightarrow M^{+n} + ne$$

where M is a metal and $n$ its valence, or in the case of the present embodiment:

$$Li \rightarrow Li^+ + e$$

The over-all equation of the cell may then be represented:

$$Li^+ + H^- \rightarrow LiH$$

Hence, the product of the cell reaction is a metal hydride, or in the present embodiment, lithium hydride.

Within insulator 26 tube shape 25 is joined by molten metal return tube 28 which enters shell 10 through insulating seal 29 and communicates with the electrolyte regenerator shown generally at 30. Intermediate shell 10 and electrolyte regenerator 30 in metal return tube 28 is pump 31.

In similar fashion electrolyte outlet tube 32 and electrolyte inlet tube 33 pass through insulating seals 34 to the regenerator 30, pump 35 being interposed in the outlet line 32 in order to circulate the electrolyte between the cell vessel 13 and the regenerator 30. Heat exchanger 36 in electrolyte inlet line 33 reduces the temperature of the incoming regenerated electrolyte to the operating temperature of the galvanic cell.

Regenerator 30 consists of a heat source shown schematically at 37 since it may be any one of a number of such sources including the circulating coolant from a nuclear reactor, a fossil fuel burner, a solar heater and the like. Adjacent the heat source 37 is regenerator vessel 38 which holds the circulating electrolyte 21 from the cell vessel 13 for a sufficient period to permit the heat from the heat source 37 to decompose the metal hydrides, in this case LiH, into hydrogen gas and metal in the metallic state; the latter will rise to the top and form a discrete layer 23r which is drawn by pump 31 through return tube 28 into the anode 23.

Current is drawn from the cell by means of positive lead wire 39 which is electrically connected to the electically conductive barrier-electrode 15, as through hydrogen inlet line 17 at 39c, and by negative lead wire 40 which is electrically connected to the anode 23 as at 41 on the anode tube 25. These lead to an electric circuit shown schematically at 42.

Hydrogen resulting from the decomposition of the metal hydride within the electrolyte regenerator 30 is led back from the latter by means of hydrogen inlet line 17. Any hydrogen that fails to diffuse through the barrier-electrode 15 is returned through loop 43 from hydrogen outlet line 18 into hydrogen inlet line 17. A supplemental hydrogen source, which is needed to make up the slight loss of hydrogen which occurs in the cycling operation is shown at 44. Supplemental hydrogen line 45 connects hydrogen source 44 with hydrogen inlet line 17.

In carrying out our invention any strongly electropositive metal capable of forming a heat-decomposable hydride may be used as the anode. Included in these are the alkali metals, alkaline earth metals, and lanthanide metals, although the last named are doubtless too expensive for commercial purposes. We prefer the alkali metals, and especially, as already mentioned, lithium.

As already indicated, the electrolyte may be any of the alkali or alkaline earth halides, or combinations of these. However, we have found to be preferable for a cell with a lithium anode either lithium chloride, or the LiF–LiCl eutectic mixture, which is about 30 mol percent (m/o) LiF and 70 m/o LiCl. Other salts that could be used are NaCl, KCl, MgCl and mixtures of any of those mentioned such as the LiCl–KCl eutectic. Whatever the particular electrolyte, we have found that the getter metal method of purification, though successful when other metals are used as diaphragms, is not suitable when a vanadium diaphragm is to be used. While this method undoubtedly does remove many types of impurities, it fails to remove them all, and those that are left are enough to cause damage to the vanadium diaphragm. Our method employs, not a reducing agent such as a getter metal, but an oxidizing agent, chlorine, and from the results achieved it is apparent that it eliminates the damage-causing impurities. We believe that these are oxalate in character, and tenaciously held waters of crystallization which getter metals cannot reach.

To carry out our invention chlorine gas is bubbled through a melt of the electrolyte salt, or salt mixture for about five or six hours, depending on the amount of water in the salt. The escaping water can be observed visually in the form of condensing vapor in a reflux condenser above the melt; this can be driven out of the condenser with a torch or Bunsen burner until no further condensation takes place. It is well to keep the temperature of the melt somewhat above the melting point of the salt or salt mixture; for example, in the case of LiF–LiCl eutectic, the melting point of which is 501° C., we keep it between 580° and 600° C. during the purification process. The melt may be purged of chlorine gas by an inert gas such as helium.

The superior results achieved by our method of electrolyte purification over the methods previously used may be explained by its essentially oxidizing character, as contrasted to the reducing character of getter metals such as columbium, titanium and the like. Previous methods have been based on the not unreasonable premise that whatever impurities are apt to damage the vanadium diaphragm by reacting with it would be equally apt to react with the getter metals, especially when these are heated in the electrolyte in the form of fine turnings presenting a large surface. The flaw in this line of reasoning is that this does not always follow; oxalate ions require oxidation in order to be quantitatively eliminated, and this is also true of the tenaciously held waters of crystallization within the coordination spheres of the lithium salts. The heated chlorine gas invades the coordination spheres of these salts and oxidizes the water to oxygen, HCl and possibly some oxides of chlorine. These gases are driven from the electrolyte by the heat. In any event, whatever the theoretical explanation, our method of electrolyte purification protects a vanadium diaphragm from corrosion, while methods previously used do not.

When the purification is finished, as shown by the cessation of condensation, the chlorine gas is purged from the melt by bubbling an inert gas through it. Our preferred gas for this purpose is helium. The melt is then cooled, either to room temperature or to the operating temperature of the cell, which in the case of our preferred embodiment with a lithium anode and an electrolyte of the LiF–LiCl eutectic, is 550° C. In either case the purified electrolyte should be under an inert gas at all times to prevent recontamination.

As indicated above, the current density of the cathode of our cell can be increased from around 150 ma./cm.$^2$ to about 500 ma./cm.$^2$ by a heat and lattice-expansion treatment. To carry this out it is preferable to first cut the vanadium sheet into the shape desired in order to prevent recontamination by the cutting tools; we have found commercially pure vanadium rolled sheet may be used without any previous etching, polishing or the like; in fact, these appear to be harmful. The cut piece of sheet is first cleaned in an organic solvent such as carbon tetrachloride or trichloroethylene and then is heated in vacuum for about twelve hours at 900° C.; this is believed to drive oxides from the surface of the sheet, but we do not want to be rigorously bound by any particular theory explaining our invention. At the end of the twelve hour heat treating the temperature is reduced to about 450° C. in an atmosphere of hydrogen which is maintained for about half an hour. This is the lattice-expanding phase of the treatment since the hydrogen gas permeates the lattice of the metal and increases its hydrogen diffusibility.

*Example I*

A cathodic hydrogen cell was made up with an anode consisting of lithium metal within a stainless steel wool sponge at the end of a stainless steel rod; this was withdrawn from time to time as the lithium in the sponge neared depletion and a fresh anode was substituted immediately. The cell vessel was a cylinder of stainless steel with a bottom part of Armco iron, a commercially pure iron. Welded around its perimeter to the iron was a circular disk diaphragm of commercially pure rolled vanadium sheet, one millimeter thick. This diaphragm received no heat or other special treatment, and was merely cleaned with trichloroethylene and dried in vacuo.

The electrolyte was 30 m/o LiF–70 m/o LiCl. This was melted and kept at between 580° and 600° C. in a quartz vessel with a reflux condenser. Purified chlorine gas was bubbled through the melt for six hours, and the melt was then purged of chlorine by bubbling purified helium through it. The melt was then cooled to about 550° C. and transferred under helium to the cell vessel.

Purified hydrogen was introduced to the gas space behind the vanadium diaphragm and an anode inserted. The cell voltage was tested immediately and found to be 0.7 v., which dropped to about 0.3 v. where it remained constant from then on. At this operating voltage the current density of the cathode diaphragm remained between 120 and 150 ma./cm.$^2$ throughout the run.

After 500 hours of operation the cell was disassembled and the diaphragm was examined for deterioration. None was found.

*Example II*

A piece of commercially pure rolled vanadium sheet metal 1 mm. thick was cut into a circular shape so as to fit as a diaphragm in a cell of the same size as in Example I. It was cleaned in trichloroethylene and heated in vacuo for twelve hours at 900° C. in a furnace. The temperature of the furnace was reduced to 450° C. and hydrogen was introduced until atmospheric pressure was attained. The diaphragm then remained in the furnace for 30 minutes.

The diaphragm was removed from the furnace under an inert atmosphere and welded into a cell in other respects the same as the cell of Example I, and the cell was activated and run under the same conditions as in Example I.

After operating this cell for a sufficient time to permit equilibrium conditions to be reached the current density of the cathode diaphragm was measured. It was found to be 500 ma./cm.$^2$.

It will be understood that the invention is not to be limited to the details given herein but that it may be modified within the scope of the appended claims.

The embodiments of the invention in which an exclusive property or privilege is claimed are defined as follows:

1. A method of making a fuel cell, comprising cutting a sheet of rolled vanadium into the shape of a cathode diaphragm, cleaning the sheet with an organic solvent, heating the diaphragm in vacuo at about 900° C. for about twelve hours, heating the diaphragm in an atmosphere of hydrogen of about 450° C. for about half an hour, surrounding a cell vessel with an inert atmosphere, inserting the diaphragm into the cell vessel in a gas-tight relationship, heating a fused salt electrolyte to a temperature somewhat above its melting temperature while bubbling purified chlorine gas through it until all the water in the electrolyte is driven off, purging the electrolyte with an inert gas, transferring the electrolyte under inert gas to the cell vessel, and inserting a metal anode into the cell vessel.

2. In a fuel cell containing a lithium anode and a vanadium diaphragm defining a hydrogen cathode, the improvement comprising the combination therewith of a fused salt electrolyte supported by said diaphragm and in contact with said anode, said electrolyte consisting of the eutectic of LiCl and LiF, which has been freed from oxygen and water of crystallization by bubbling chlorine therethrough and means for preventing recontamination of said eutectic.

3. A method of increasing the efficiency and corrosion resistance of a fuel cell consisting of a metal vessel having an iron wall portion, a vanadium diaphragm extending across the vessel and welded to the iron wall portion thereof, and thereby forming a space above and below said diaphragm, means for introducing hydrogen into the space under the diaphragm, a fused salt electrolyte resting on the diaphragm, an alkali metal or alkaline earth metal anode in contact with the fused salt, and separated from said iron wall portion means for heating the vessel, means for maintaining an inert atmosphere in the vessel, and electrical connections for drawing current from the cell, comprising:

purifying said fused salt electrolyte by flowing chlorine therethrough before use by essentially eliminating water of crystallization and oxygen therefrom and heating the vanadium diaphragm in a vacuum prior to use to drive oxides from the diaphragm.

4. Method according to claim 3 wherein the impurities are eliminated from the fused salt by melting the salt and bubbling a chlorine-containing gas therethrough.

5. Method according to claim 4 wherein the anode metal is lithium and the cation of the fused salt is lithium.

6. Method according to claim 5 wherein the fused salt is the LiCl–LiF eutectic.

7. Method according to claim 6 wherein the vanadium diaphragm is also heated in an atmosphere of hydrogen subsequent to heating it in a vacuum.

References Cited

Technical Documentary Report No. ASD–TDR–62–18, pages 34, 35, 39 and 41.

WINSTON A. DOUGLAS, *Primary Examiner.*

H. FEELEY, *Assistant Examiner.*